Dec. 29, 1925.  
E. HIGGINS  
1,567,145
SHAFT COUPLING
Filed March 15, 1924
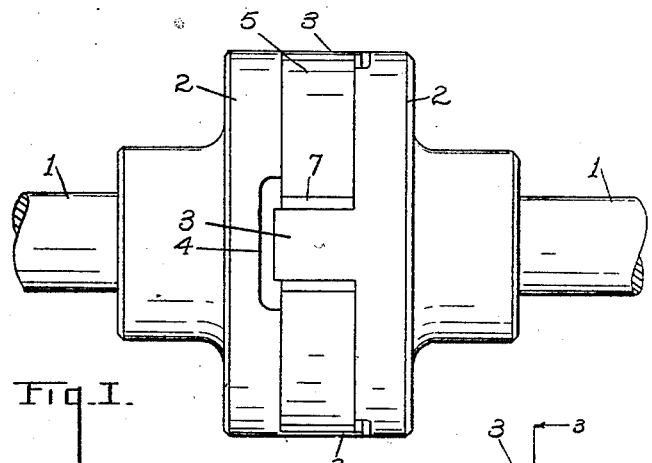
Fig. I.
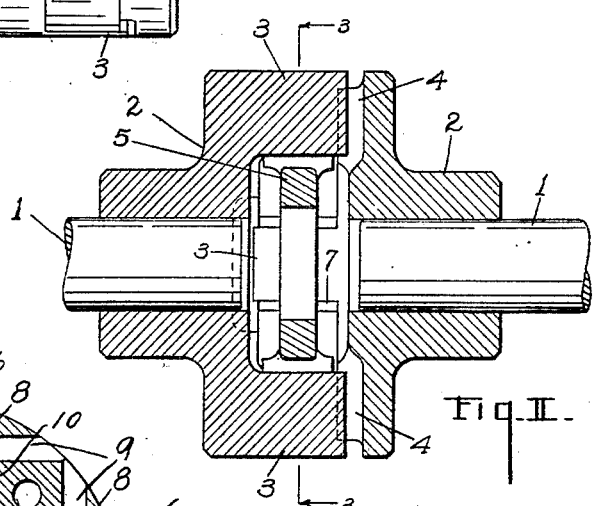
Fig. II.
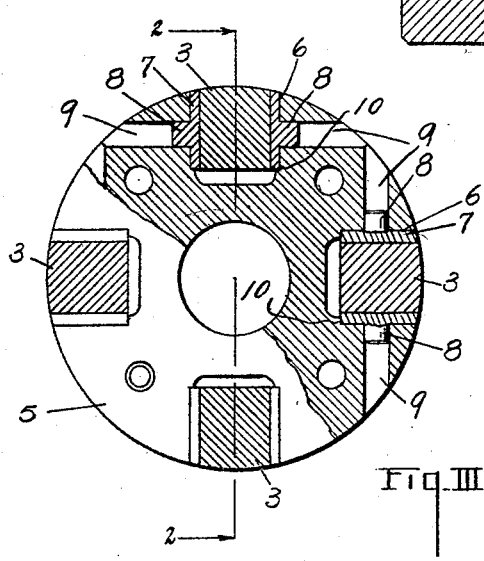
Fig. III.
INVENTOR  
Eugene Higgins  
BY Chappell Earl  
ATTORNEYS.

Patented Dec. 29, 1925.

1,567,145

UNITED STATES PATENT OFFICE.

EUGENE HIGGINS, OF JACKSON, MICHIGAN.

SHAFT COUPLING.

Application filed March 15, 1924. Serial No. 699,529.

*To all whom it may concern:*

Be it known that I, EUGENE HIGGINS, a citizen of the United States, residing at the city and county of Jackson, State of Michigan, have invented certain new and useful Improvements in Shaft Couplings, of which the following is a specification.

This invention relates to improvements in shaft couplings.

The main object of this invention is to provide an improved shaft coupling adapted for heavy work, that is, the transmission of heavy loads and at high speeds, which is very durable and requires a minimum of attention.

A further object is to provide an improved shaft coupling having these advantages which does not require lubrication.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side view of my improved shaft coupling, the shaft sections being partially broken away.

Fig. II is a longitudinal section on a line corresponding to line 2—2 of Fig. III, the sections of shaft being shown in full lines.

Fig. III is a detail view mainly in transverse section on a line corresponding to line 3—3 of Fig. II.

In the drawing the sectional views are taken looking in the direction of the little arrows at the ends of the section lines and similar numerals of reference refer to similar parts throughout the several views.

Referring to the drawing, 1, 1 represent the shaft sections to be coupled. The shaft members 2 are duplicates, each being adapted to receive one of the shaft sections 1. Each shaft member is provided with a pair of driving lugs 3 disposed oppositely and each has recesses 4 alined with the lugs of the opposite member so that the driving lugs of one may project into the recesses of the other as shown in Figs. I and II.

I provide a cruciform coupling member 5 having slot-like radial bearing openings 6 to receive the lugs 3. The bearing faces of these bearing openings are provided with bearing members 7 of self-lubricating bearing metal. The bearing members 7 have lugs 8 on their rear sides projecting into the bores 9 in the coupling member so that when the driving lugs are disposed between the bearing plates the plates are retained in their assembled position. The openings 6 have shoulders 10 at their inner ends engaging the inner edges of the bearing plates, thus supporting them against rotative movement.

By this arrangement of parts I am enabled to provide bearings which do not require lubrication, the bearing members 7 being, as stated, of self-lubricating bearing metal and these members are renewed from time to time as occasion requires. The recesses 4 permit the driving lugs to project entirely through the coupling member so that the bearing plates are not scored or worn by the ends of the lugs.

My improved coupling, as stated, is well adapted for heavy duty, is economical in structure and requires little attention.

Having thus described my invention what I claim as new and desire to secure by Letters Patent is:

1. A shaft coupling comprising a pair of shaft members each having driving lugs and recesses adapted to receive the driving lugs of the other member, a cruciform coupling member coacting with the driving lugs of both shaft members, and bearing members mounted on the bearing faces of said coupling member to coact with said driving lugs, said coupling member having bores disposed transversely of its bearing faces, said bearing members having lugs engaging said bores whereby the bearing members are retained in position when the driving lugs are in position.

2. A shaft coupling comprising a pair of shaft members, each having driving lugs, a cruciform coupling member coacting with said driving lugs of both shaft members, and bearing members mounted on the bearing faces of the coupling members to coact with said driving lugs, said coupling member having recesses in its bearing faces, said bearing members having lugs engaging said recesses whereby the bearing members are retained in position when the driving lugs are in position.

In witness whereof I have hereunto set my hand.

EUGENE HIGGINS.